United States Patent [19]
Cartwright

[11] Patent Number: 6,062,982
[45] Date of Patent: May 16, 2000

[54] FORCE TRANSMITTING APPARATUS

[75] Inventor: Mark A. Cartwright, West Lafayette, Ind.

[73] Assignee: TRW Inc., Lyndhurst, Ohio

[21] Appl. No.: 09/076,271

[22] Filed: May 12, 1998

[51] Int. Cl.⁷ .................. F16L 27/12; F16D 3/40
[52] U.S. Cl. .............. 464/113; 464/162; 464/134; 403/3; 403/270
[58] Field of Search .................. 464/136, 135, 464/134, 162, 113, 183; 74/492; 280/779; 403/3, 4, 270, 271

[56] References Cited

U.S. PATENT DOCUMENTS

| | | | |
|---|---|---|---|
| 2,116,290 | 5/1938 | Spicer | 464/162 |
| 3,344,618 | 10/1967 | Young | 464/162 |
| 4,125,000 | 11/1978 | Gall | 464/134 |
| 4,881,924 | 11/1989 | Gall | 464/134 |
| 5,439,252 | 8/1995 | Oxley et al. | |
| 5,507,203 | 4/1996 | Audibert et al. | 74/492 |
| 5,732,600 | 3/1998 | Peterson et al. | 74/492 |

Primary Examiner—Pamela Hawthorne
Assistant Examiner—John R. Cottingham
Attorney, Agent, or Firm—Tarolli, Sundheim, Covell, Tummino & Szabo L.L.P.

[57] ABSTRACT

An apparatus (10) for turning steerable vehicle wheels (12 and 14) includes a plurality of longitudinally extending force transmitting members (24, 40, 42, 46 and 48) which are connected with coupling assemblies (30, 34 and 36). At least some of the coupling assemblies (30, 34 and 36) include an improved coupling component (52) having a base (56) with a first circular, radially outwardly facing mounting surface (64) for engaging an inner side surface (84) on a tubular force transmitting member (40). In addition, the base (56) of the coupling component (52) includes a second circular mounting surface (66) having a diameter which is smaller than the diameter of the first circular mounting surface (64) and which is engageable with an inner side surface (94) of a tubular force transmitting member (48) having a smaller diameter than the first tubular force transmitting member (40). In addition, the base (56) includes a radially inwardly facing circular mounting surface (68) which is engageable with an outer side surface (110) of a force transmitting member (24).

8 Claims, 3 Drawing Sheets

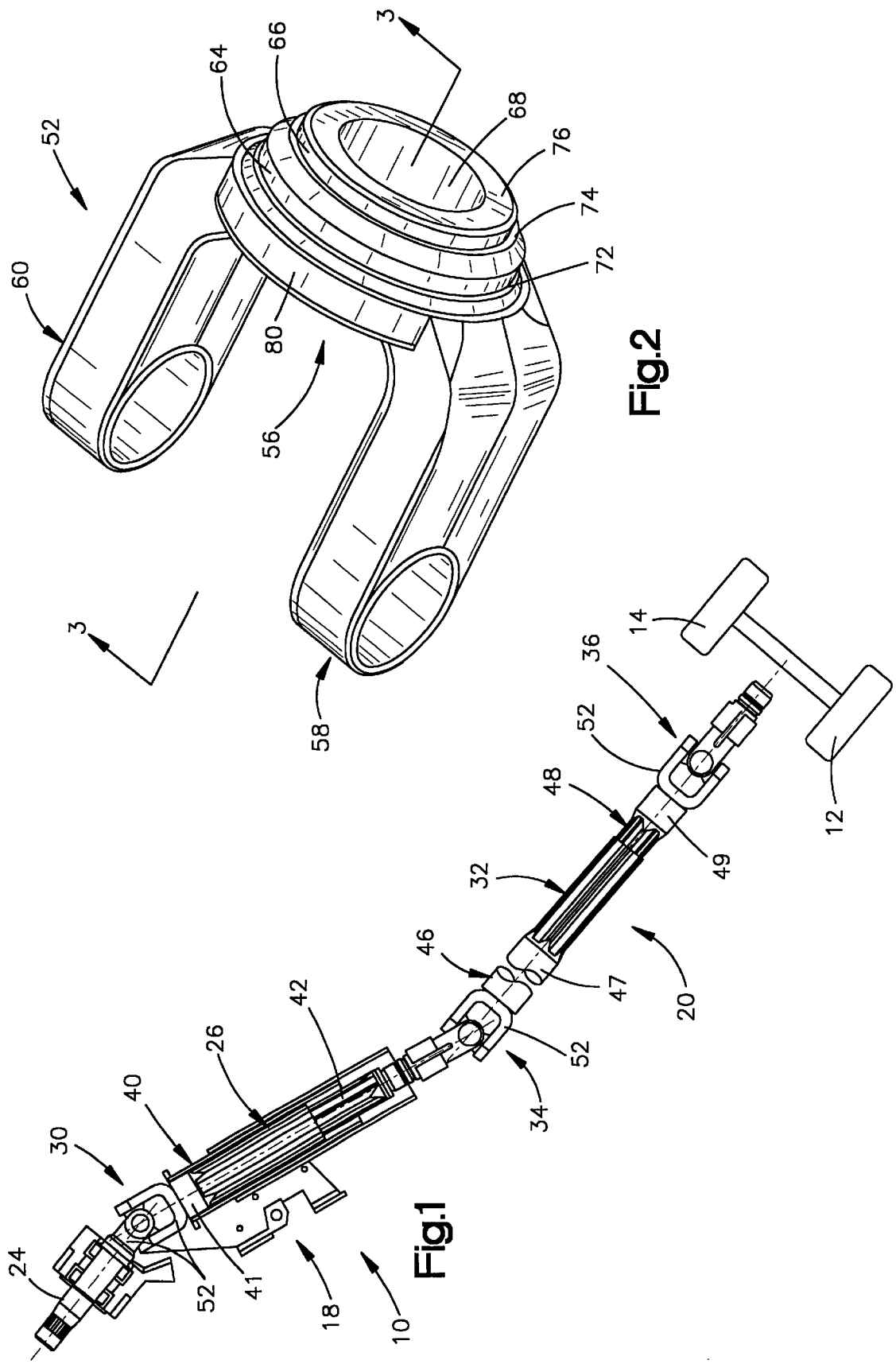

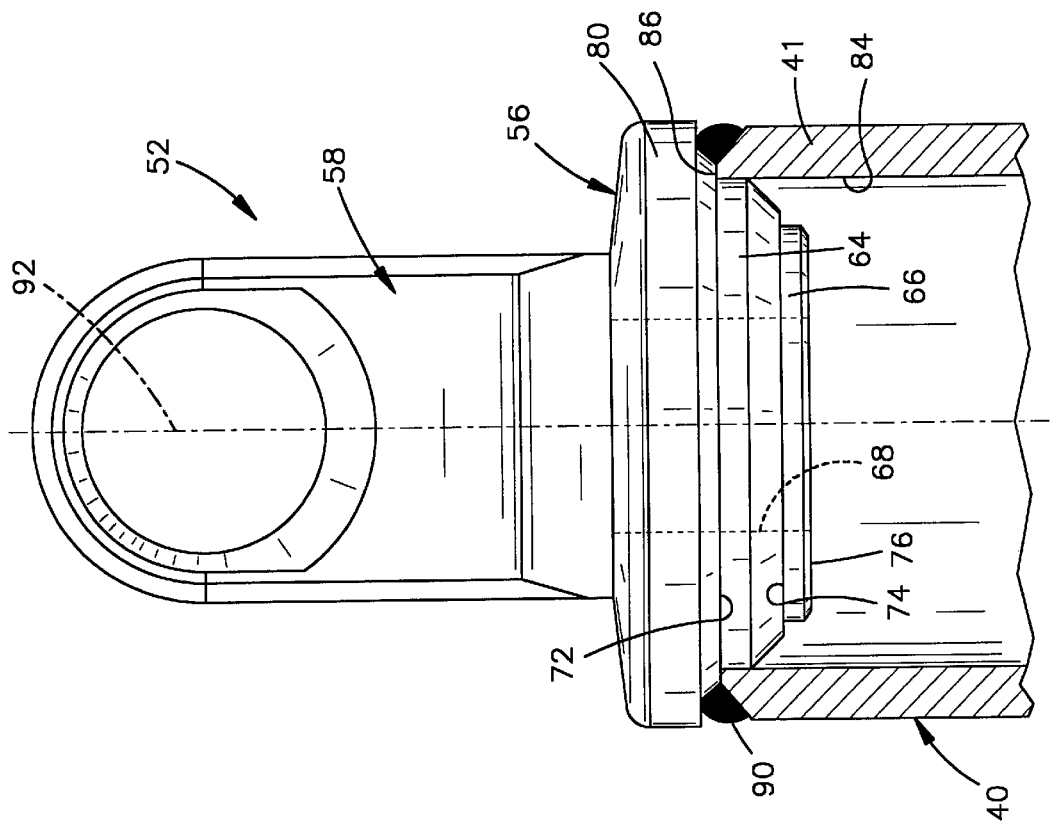
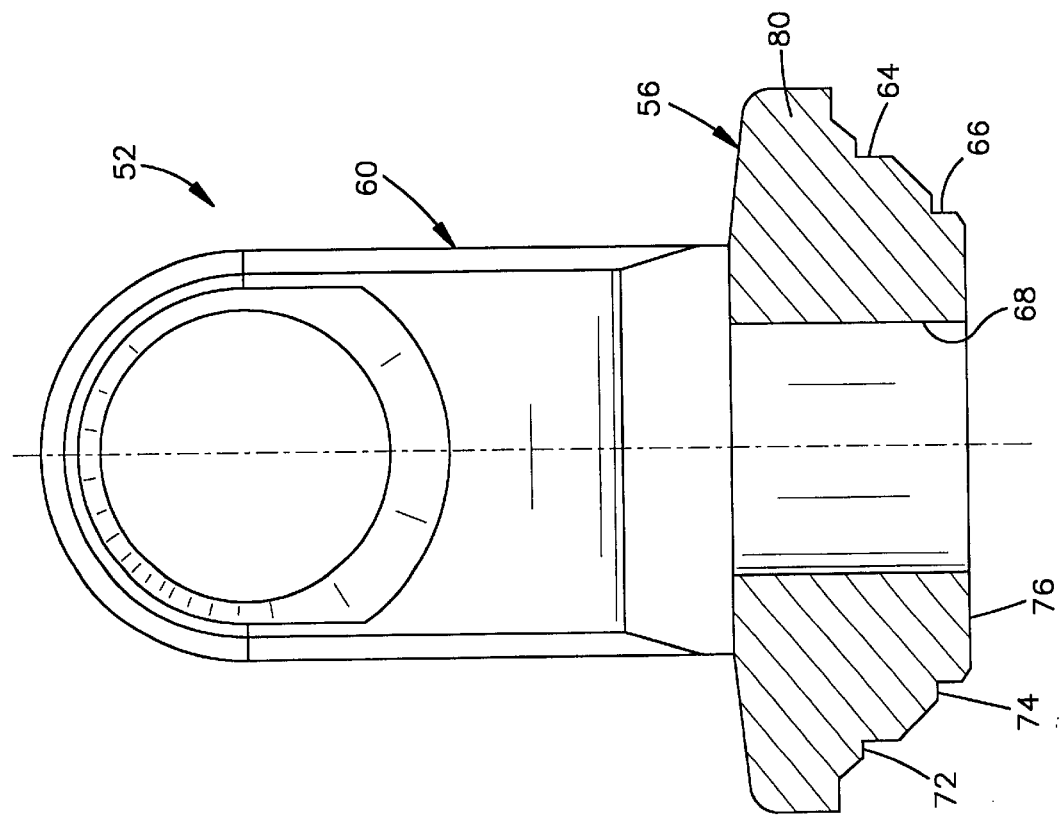

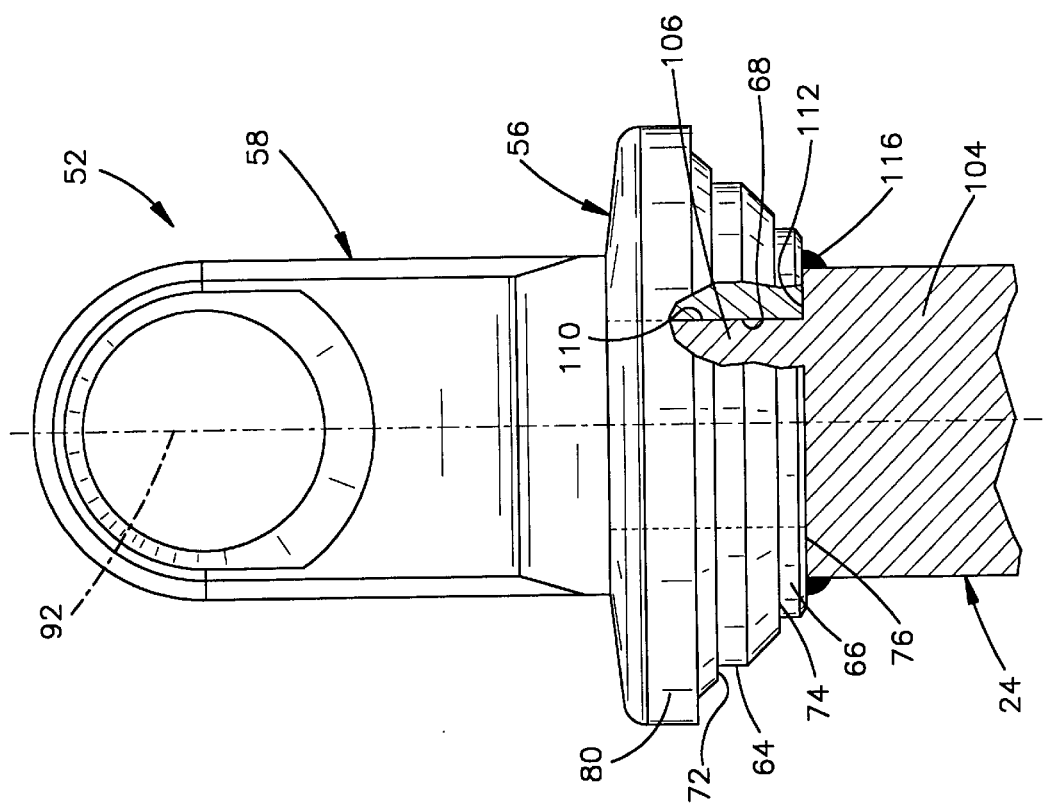
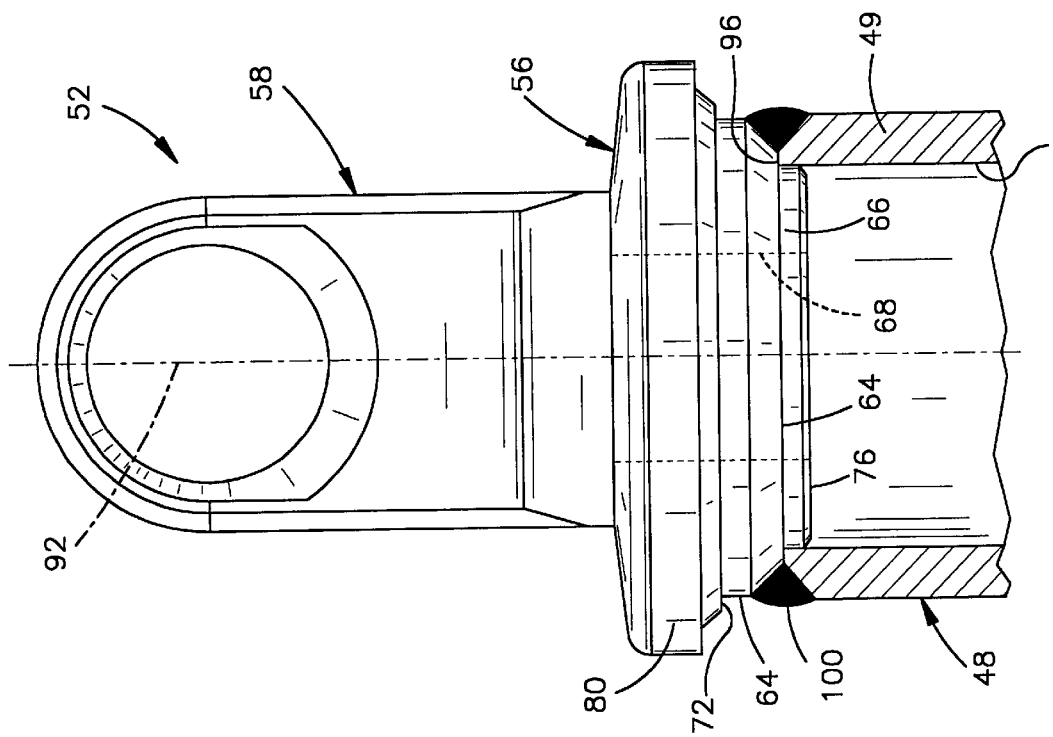

FORCE TRANSMITTING APPARATUS

BACKGROUND OF THE INVENTION

The present invention relates to a new and improved apparatus having coupling assemblies connected with force transmitting members.

A known steering apparatus is used in a vehicle to turn steerable vehicle wheels. This known steering apparatus includes an adjustable steering column through which force is transmitted from a manually rotatable steering wheel to steerable vehicle wheels. The adjustable steering column may include a plurality of force transmitting tubes and/or shafts which are interconnected by a plurality of coupling assemblies.

The coupling assemblies may be of the well known universal type. The coupling assemblies include a plurality of yokes which are interconnected by drive pins in a known manner to accommodate angular adjustment and variations in length of the force transmitting members. Known adjustable steering columns having this general construction are disclosed in U.S. Pat. Nos. 4,753,121; 4,972,732; 4,976,167; 5,363,716; and 5,439,252.

SUMMARY OF THE INVENTION

The present invention relates to a new and improved apparatus which includes a plurality of longitudinally extending force transmitting members having end portions with circular cross sectional configurations of different diameters. A plurality of coupling assemblies interconnect the force transmitting members. The plurality of coupling assemblies include a first coupling component fixedly connected with a first force transmitting member and a second coupling component fixedly connected with a second force transmitting member.

The first and second coupling components may be part of either the same coupling assembly or different coupling assemblies. The first and second coupling components have the same construction. Each of the first and second coupling components has a base with a first circular mounting surface for engaging a force transmitting member having an end portion with a first diameter and a second circular mounting surface for engaging a force transmitting member having an end portion with a second diameter.

BRIEF DESCRIPTION OF THE DRAWINGS

The foregoing and other features of the present invention will become more apparent to one skilled in the art to which the present invention relates upon consideration of the following description of the invention with reference to the accompanying drawings wherein:

FIG. 1 is a schematic illustration depicting a vehicle steering apparatus constructed in accordance with the present invention;

FIG. 2 is an enlarged pictorial illustration of an improved coupling component used in the steering apparatus of FIG. 1;

FIG. 3 is a sectional view, taken along the line 3—3 of FIG. 2, further illustrating the construction of the coupling assembly component;

FIG. 4 is a fragmentary sectional view illustrating the manner in which a tubular force transmitting member, having an end portion with a relatively large diameter, is connected with the coupling assembly component of FIGS. 2 and 3;

FIG. 5 is a fragmentary sectional view illustrating the manner in which a tubular force transmitting member, having an end portion with a relatively small diameter, is connected with the coupling assembly component of FIGS. 2 and 3; and FIG. 6 is a fragmentary sectional view illustrating the manner in which a solid force transmitting member or shaft, having an end portion with a diameter which is less than the diameter of the end portions of the tubular force transmitting members of FIGS. 4 and 5, is connected with the coupling assembly component of FIGS. 2 and 3.

DESCRIPTION OF ONE SPECIFIC PREFERRED EMBODIMENT OF THE INVENTION

A steering apparatus 10 (FIG. 1) is utilized to turn steerable vehicle wheels 12 and 14 in a known manner. The steering apparatus 10 includes a tilt and telescope steering column 18 and an intermediate steering column 20. Rather than a tilt and telescope steering column 18, a tilt only or a nonadjustable steering column could be utilized. The tilt and telescope steering column 18 and the intermediate steering column 20 are of variable length.

The tilt and telescope steering column 18 includes a solid input shaft 24 which is connected with a variable length shaft 26 by a coupling assembly 30. If desired, the shaft 24 could have a tubular construction. A variable length shaft 32, in the intermediate steering column 20, is connected with the variable length shaft 26 in the tilt and telescope steering column 18 by a coupling assembly 34. The variable length shaft 32 is connected with the steerable vehicle wheels 12 and 14 through a coupling assembly 36.

The variable length shaft 26 in the tilt telescope steering column 18 includes a tubular force transmitting member 40. The tubular force transmitting member 40 has a relatively large diameter, cylindrical end portion 41. The end portion 41 of the tubular force transmitting member 40 is connected to the coupling assembly 30.

The variable length shaft 26 also includes a tubular force transmitting member 42. The tubular force transmitting member 42 is connected to the coupling assembly 34. The tubular force transmitting member 42 is telescopically received in the tubular force transmitting member 40.

The tubular force transmitting members 40 and 42 are axially movable relative to each other to vary the overall length of the variable length shaft 26. The tubular force transmitting member 40 has straight internal splines which engage straight external splines on the tubular force transmitting member 42 to hold the force transmitting members 40 and 42 against rotation relative to each other. Although the tilt and telescope steering column 18 could have many different known constructions, the steering column 18 may be constructed in the manner disclosed in U.S. Pat. No. 5,363,716.

The variable length shaft 32 in the intermediate steering column 20 includes a large diameter force transmitting member 46. The tubular force transmitting member 46 has a relatively large diameter, cylindrical end portion 47. The end portion 47 of the tubular force transmitting member 46 has the same inside diameter as the cylindrical end portion 41 of the tubular force transmitting member 40. The end portion 47 of the tubular force transmitting member 46 is connected to the coupling assembly 34.

The variable length shaft 32 also includes a tubular force transmitting member 48. The tubular force transmitting member 48 has a relatively small diameter, cylindrical end portion 49. The end portion 49 of the tubular force transmitting member 48 has an inside diameter which is smaller than the inside diameter of the end portion 41 of the tubular force transmitting member 40. The end portion 49 of the tubular force transmitting member 48 is connected to the coupling assembly 36.

The tubular force transmitting members 46 and 48 are axially movable relative to each other to vary the overall length of the variable length shaft 32. The tubular force transmitting member 46 has straight internal splines which engage straight external splines on the tubular force transmitting member 48 to prevent relative rotation between the force transmitting members 46 and 48. Although the variable length shaft 32 could have many different constructions, it is contemplated that the variable length shaft 32 could have the construction disclosed in U.S. Pat. No. 5,460,574 if desired.

The coupling assemblies 30, 34 and 36 are universal joints of the Hooke type. However, it should be understood that other known types of joints could be utilized if desired. The coupling assemblies 30, 34 and 36 interconnect the shafts 24, 26 and 32 and accommodate misalignment of the longitudinal central axes of the shafts.

In accordance with a feature of the present invention, an improved coupling component or yoke 52 is connectable with different size force transmitting members. Thus, the coupling component or yoke 52 may be connected with the input shaft 24, the tubular force transmitting member 40 in the variable length shaft 26, and the tubular force transmitting members 46 and 48 in the variable length shaft 32. In the embodiment of the invention illustrated in FIG. 1, two coupling components 52 are used in the coupling assembly 30. In addition, a coupling component 52 is used in each of the coupling assemblies 34 and 36. By using identical coupling components 52 in a plurality of the coupling assemblies 30, 34 and 36, construction of the steering apparatus 10 is simplified. In addition, the maintaining of inventories of replacement parts and/or repair of the steering apparatus 10 is simplified.

To enable the coupling assembly component 52 to be used in coupling assemblies 30, 34 and 36, the coupling assembly component 52 can be connected with force transmitting members of different sizes and constructions. Thus, the coupling component 52 can be connected with the solid input shaft 24. The coupling assembly component 52 can be connected with the relatively large diameter tubular force transmitting members 40 and 46. In addition, the coupling assembly component 52 can be connected with the relatively small diameter tubular force transmitting member 48.

The coupling component 52 includes a generally circular base or mounting section 56 (FIGS. 2 and 3). A pair of parallel arms 58 and 60 extend outward in one direction from the base 56. The arms 58 and 60 are integrally formed as one piece with the base 56.

In accordance with one of the features of the present invention, a plurality of different diameter circular mounting surfaces are provided on a side of the base 56 opposite from the arms 58 and 60. The plurality of circular mounting surfaces on the base 56 enable the base to be connected with a solid shaft, similar to the input shaft 24 of FIG. 1, with a relatively large diameter tubular force transmitting member, similar to the force transmitting members 40 and 46, or with a small diameter tubular force transmitting member, similar to the force transmitting member 48.

To enable the base 56 (FIGS. 2 and 3) of the coupling component 52 to be connected with either the tubular force transmitting member 40 or 46, the base 56 has a large diameter, cylindrical, radially outward facing mounting surface 64. To enable the base 56 of the coupling component 52 to be connected with the small diameter tubular force transmitting member 48, the base has an intermediate diameter, cylindrical, radially outward facing mounting surface 66. To enable the base 56 of the coupling component 52 to be connected with the input shaft 24, the base has a small diameter, cylindrical, radially inward facing mounting surface 68. The mounting surface 68 defines a passage which extends axially through the center of the base 56.

The mounting surfaces 64, 66 and 68 are disposed in a coaxial relationship. However, the mounting surfaces 64 and 66 are axially offset from each other. Thus, the mounting surface 66 is disposed axially outward of the mounting surface 64.

Stop or locating surfaces are associated with each of the mounting surfaces 64, 66 and 68 to facilitate axial positioning of force transmitting members relative to the base 56. Thus, a flat annular stop or locating surface 72 extends radially outward from the large diameter mounting surface 64 (FIGS. 2 and 3) and is engageable with a circular end surface on the large diameter force transmitting member 40 or 46. A flat annular stop or locating surface 74 extends radially outward from the intermediate diameter mounting surface 66 and is engageable with a circular end surface on the small diameter force transmitting member 48. A flat, annular stop or locating surface 76 extends radially outward from the small diameter mounting surface 68 and is engageable with a circular surface on the input shaft 24. The stop surfaces 72, 74 and 76 are disposed in coaxial relationship with each other and with the mounting surfaces 64, 66 and 68.

In the illustrated embodiment of the coupling component 52, the mounting surfaces 64 and 66 project axially outward from a circular main section 80 of the base 56. However, if desired, the mounting surfaces 64 and 66 could be disposed in a recess formed on the base 56 and would have a radially inwardly facing orientation.

The mounting surface 68 could be formed on a relatively small diameter projection from the main section 80 of the base 56. If this was done, the mounting surface 68 would be used with relatively small diameter tubular force transmitting members rather than a solid shaft, such as the input shaft 24. By forming the mounting surface 68 with the radially inward facing orientation illustrated in FIG. 3, the mounting surface can be used to engage an outer side surface of a solid shaft rather than an inner side surface of a tubular shaft.

The manner in which the coupling component 52 is connected with the force transmitting member 40 is illustrated in FIG. 4. When the coupling component 52 is to be connected with the force transmitting member 40, the large diameter mounting surface 64 is inserted into the large diameter force transmitting member 40. This results in a cylindrical inner side surface 84 on the large diameter cylindrical end portion 41 of the force transmitting member 40 being disposed in telescopic abutting engagement with the large diameter mounting surface 64.

A flat annular end surface 86 on the cylindrical end portion 41 of the force transmitting member 40 is 5 disposed in abutting engagement with the stop surface 72 to position the coupling component 52 axially relative to the force transmitting member 40. An annular weld 90 fixedly interconnects the force transmitting member 40 and the coupling component 52. A central axis 92 of the coupling component 52 is coincident with a longitudinal central axis of the force transmitting member 40.

The manner in which the small diameter cylindrical end portion 49 of the force transmitting member 48 is connected with the coupling component 52 is illustrated in FIG. 5. The intermediate mounting surface 66 is inserted into the small diameter cylindrical end portion 49 of the force transmitting member 48. This results in a cylindrical inner side surface 94 on the small diameter force transmitting member 48 being disposed in telescopic abutting engagement with the intermediate diameter mounting surface 66 on the base 56 of the coupling assembly component 52.

A flat annular end surface 96 on the small diameter force transmitting member 48 is disposed in abutting engagement with the stop surface 74 to position the coupling component 52 axially relative to the small diameter force transmitting member 48. An annular weld 100 interconnects the coupling component 52 and the small diameter force transmitting member 48. At this time, a longitudinal central axis of the small diameter force transmitting member 48 is coincident with the central axis 92 of the coupling component 52.

The manner in which the input shaft 24 is connected with the coupling component 52 is illustrated in FIG. 6. In the embodiment of the invention illustrated in FIG. 6, the input shaft 24 has a solid construction with a cylindrical body section 104 and a cylindrical end section 106 which are disposed in a coaxial relationship. The end section 106 is telescopically inserted into the cylindrical small diameter mounting surface 68 which extends axially through the base 56.

A cylindrical outer side surface 110 on the end section 106 is disposed in telescopic abutting engagement with the small diameter mounting surface 68 on the base 56 of the coupling component 52. A flat annular shoulder surface 112, which extends radially outward from the outer side surface 110 on the end section 106, is disposed in abutting engagement with the stop surface 76 on the coupling component 52 to position the coupling component axially relative to the input shaft 24. At this time, the central axis 92 of the coupling component 52 is coincident with a longitudinal central axis of the input shaft 24. An annular weld 116 interconnects the input shaft 24 and the coupling component 52.

From the above description of the invention, those skilled in the art will perceive improvements, changes and modifications. Such improvements, changes and modifications within the skill of the art are intended to be covered by the appended claims.

Having described the invention, the following is claimed:

1. An apparatus comprising:
    a plurality of longitudinally extending force transmitting members having end portions with circular cross sectional configurations, said plurality of force transmitting members include a first force transmitting member having an end portion with a first diameter and a second force transmitting member having an end portion with a second diameter which is different than the first diameter; and
    a plurality of coupling assemblies interconnecting said plurality of force transmitting members, said plurality of coupling assemblies including a first coupling component fixedly connected with the end portion of said first force transmitting member and second coupling component fixedly connected with the end portion of said second force transmitting member;
    each of said first and second coupling components being identical in shape and in size and including a base having a first circular mounting surface for engaging a force transmitting member having an end portion with the first diameter and a second circular mounting surface for engaging a force transmitting member having an end portion with the second diameter.

2. An apparatus as set forth in claim 1 wherein said first and second mounting surfaces on said first coupling component are disposed in coaxial relationship on a first side of said base of said first coupling component and said first and second mounting surfaces on said second coupling component are disposed in a coaxial relationship on a first side of said base of said second coupling component.

3. An apparatus as set forth in claim 1 wherein said first circular mounting surfaces on said first coupling component and on said second coupling component face radially outward and are engageable with circular inner side surfaces on end portions of force transmitting members and said second circular mounting surfaces on said first coupling component and on said second coupling component face radially inward and are engageable with circular outer side surfaces on end portions of force transmitting members.

4. An apparatus as set forth in claim 1 wherein said first circular mounting surfaces on said first coupling component and on said second coupling component face radially outward and are engageable with circular inner side surfaces on end portions of force transmitting members, said second circular mounting surfaces on said first coupling component and on said second coupling component face radially outward and are engageable with circular inner side surfaces on end portions of force transmitting members.

5. An apparatus comprising:
    a plurality of longitudinally extending force transmitting members having end portions with circular cross sectional configurations, said plurality of force transmitting members include a first force transmitting member having an end portion with a first diameter and a second force transmitting member having an end portion with a second diameter which is different than the first diameter; and
    a plurality of coupling assemblies interconnecting said plurality of force transmitting members, said plurality of coupling assemblies including a first coupling component fixedly connected with the end portion of said first force transmitting member and a second coupling component fixedly connected with the end portion of said second force transmitting member;
    each of said first and second coupling components having the same construction which includes a base having a first circular mounting surface for engaging a force transmitting member having an end portion with the first diameter and a second circular mounting surface for engaging a force transmitting member having an end portion with the second diameter; and
    the end portion of said first force transmitting member has a circular inner side surface which engages said first circular mounting surface on said first coupling component and extends around and is spaced from said second circular mounting surface on said first coupling component.

6. An apparatus as set forth in claim 5 wherein the end portion of said second force transmitting member has a circular inner side surface which engages said second circular mounting surface on said second coupling component and is offset radially inward from said first circular mounting surface on said second coupling component.

7. An apparatus as set forth in claim 5 wherein the end portion of said second force transmitting member has a circular outer side surface which engages said second circular mounting surface on said second coupling component and is offset radially inward from said first circular mounting surface on said second coupling component.

8. An apparatus comprising:

a longitudinally extending force transmitting member;

a second longitudinally extending force transmitting member which is telescopically received in said first force transmitting member, said first and second force transmitting members being axially movable relative to each other and being held against rotation relative to each other;

a first coupling component fixedly connected to one end portion of said first force transmitting member; and a second coupling component fixedly connected to one end portion of said second force transmitting member;

said first and second coupling components being identical in shape and in size and each including a first outwardly facing cylindrical mounting surface having a first diameter, a second outwardly facing cylindrical mounting surface having a second diameter which is smaller than said first diameter, and a third inwardly facing cylindrical mounting surface having a third diameter which is smaller than said second diameter;

said one end portion of said first force transmitting member being disposed in engagement with one of said cylindrical mounting surfaces on said first coupling component;

said one end portion of said second force transmitting member being disposed in engagement with one of said cylindrical mounting surfaces on said second coupling component.

* * * * *